(12) United States Patent
Pathirane et al.

(10) Patent No.: US 9,710,359 B2
(45) Date of Patent: Jul. 18, 2017

(54) EXECUTING DEBUG PROGRAM INSTRUCTIONS ON A TARGET APPARATUS PROCESSING PIPELINE

(71) Applicant: ARM LIMITED, Cambridge (GB)

(72) Inventors: Chiloda Ashan Senerath Pathirane, Cambridge (GB); Allan John Skillman, Cambridge (GB)

(73) Assignee: ARM Limited, Cambridge (GB)

( * ) Notice: Subject to any disclaimer, the term of this patent is extended or adjusted under 35 U.S.C. 154(b) by 171 days.

(21) Appl. No.: 14/685,799

(22) Filed: Apr. 14, 2015

(65) Prior Publication Data

US 2015/0363293 A1 Dec. 17, 2015

(30) Foreign Application Priority Data

Jun. 11, 2014 (GB) .................................. 1410373.3

(51) Int. Cl.
*G06F 11/00* (2006.01)
*G06F 11/36* (2006.01)

(52) U.S. Cl.
CPC ...... *G06F 11/3636* (2013.01); *G06F 11/3648* (2013.01); *G06F 11/3664* (2013.01)

(58) Field of Classification Search
CPC ............. G06F 11/3636; G06F 11/3648; G06F 11/3664
USPC .................................. 714/30, 38.1
See application file for complete search history.

(56) References Cited

U.S. PATENT DOCUMENTS 6,314,530 B1 * 11/2001 Mann .................... G06F 11/348
714/25
8,200,908 B2 * 6/2012 Moyer ................ G06F 12/0831
711/141
8,688,910 B2 * 4/2014 Moyer ................ G06F 12/0831
711/118
9,432,298 B1 * 8/2016 Smith .................. H04L 49/9057
2001/0007125 A1 7/2001 Cofler et al.
2007/0180333 A1 * 8/2007 Thekkath ............ G06F 11/3636
714/45
2008/0040587 A1 * 2/2008 Burke ................ G06F 11/3648
712/227
2008/0114972 A1 5/2008 Codrescu et al.
(Continued)

FOREIGN PATENT DOCUMENTS

GB 2483906 3/2012

OTHER PUBLICATIONS

Search Report for GB1410373.3 dated Jan. 27, 2015, three pages.

*Primary Examiner* — Elmira Mehrmanesh
(74) *Attorney, Agent, or Firm* — Nixon & Vanderhye P.C.

(57) ABSTRACT

A target apparatus 2 for debug includes a processing pipeline 18 for executing a sequence of program instructions. A debug interface 26 receives debug command signals corresponding directly or indirectly to debug program instructions to be executed. An instruction buffer 24 stores both the debug program instructions and non-debug program instructions. An arbiter 30 selects between both the debug program instructions and the non-debug program instructions stored within the instruction buffer to form the sequence of program instructions to be executed by the processing pipeline. A complex coherent memory system 4, 6, 8, 10, 12, 14, 32 is shared by the debug program instructions and the non-debug program instructions such that they obtain the same coherent view of memory.

22 Claims, 4 Drawing Sheets

(56) References Cited

U.S. PATENT DOCUMENTS

| | | | |
|---|---|---|---|
| 2008/0263379 A1* | 10/2008 | Tuuk | G06F 9/3861 713/375 |
| 2008/0270107 A1* | 10/2008 | George | G06F 9/455 703/28 |
| 2008/0294885 A1* | 11/2008 | Feiste | G06F 9/30181 712/245 |
| 2012/0159447 A1 | 6/2012 | Boisde et al. | |
| 2014/0173342 A1* | 6/2014 | Kaushikkar | G06F 11/273 714/30 |

* cited by examiner

EXECUTING DEBUG PROGRAM INSTRUCTIONS ON A TARGET APPARATUS PROCESSING PIPELINE

This application claims priority to GB Patent Application No. 1410373.3 filed 11 Jun. 2014, the entire content of which is hereby incorporated by reference.

BACKGROUND

This invention relates to data processing systems. More particularly, this invention relates to debug techniques for data processing systems.

It is known to provide data processing systems with debug mechanisms to enable problems with hardware and software operation to be identified. Some known debug mechanisms require program instruction execution to be halted where upon debug program instructions may be serially scanned into the target apparatus and then executed. It is also known to provide debug mechanisms in which a debug access port circuit may be used to issue load and store instructions to the system bus in order to gather debug information.

SUMMARY

Viewed from one aspect the present technique provides an apparatus for processing data comprising:
a processing pipeline configured to execute a sequence of program instructions;
a debug interface configured to receive debug command signals corresponding to debug program instructions to be executed;
instruction buffer circuitry configured to store both said debug program instructions and non-debug program instructions; and
an arbiter coupled to said instruction buffer and configured to arbitrate between both said debug program instructions and said non-debug program instructions stored within said instruction buffer to select said sequence of program instructions to be executed by said processing pipeline.

Viewed from another aspect the present technique provides apparatus for processing data comprising:
processing pipeline means for executing a sequence of program instructions;
debug interface means for receiving debug command signals corresponding to debug program instructions to be executed;
instruction buffer means for storing both said debug program instructions and non-debug program instructions; and
arbitration means, coupled to said instruction buffer means, for arbitrating between both said debug program instructions and said non-debug program instructions stored within said instruction buffer means to select said sequence of program instructions to be executed by said processing pipeline means.

Viewed from a further aspect the present technique provides a method of processing data comprising the steps of:
executing a sequence of program instructions using a processing pipeline;
receiving via a debug interface debug command signals corresponding to debug program instructions to be executed;
storing within an instruction buffer both said debug program instructions and non-debug program instructions; and
arbitrating between both said debug program instructions and said non-debug program instructions stored within said instruction buffer to select said sequence of program instructions to be executed by said processing pipeline.

Viewed from a further aspect the present technique provides a method of debugging a target apparatus for processing data, said method comprising the steps of:
generating debug command signals using a debug controller;
transmitting said debug command signals to said target apparatus;
receiving via a debug interface of said target apparatus said debug command signals corresponding to debug program instructions to be executed;
storing within an instruction buffer of said target apparatus both said debug program instructions and non-debug program instructions;
arbitrating, using an arbiter of said target apparatus, between both said debug program instructions and said non-debug program instructions stored within said instruction buffer to select a sequence of program instructions to be executed by a processing pipeline of said target apparatus; and
executing said sequence of program instructions using said processing pipeline of said target apparatus.

The present technique may also be used as part of a debug system comprising a debug controller (e.g. a general purpose computer and an appropriate adapter) to generate debug command signals for a target apparatus as described above.

The above, and other objects, features and advantages of this disclosure will be apparent from the following detailed description of illustrative embodiments which is to be read in connection with the accompanying drawings.

DESCRIPTION OF EXAMPLE EMBODIMENTS

Figure 1:
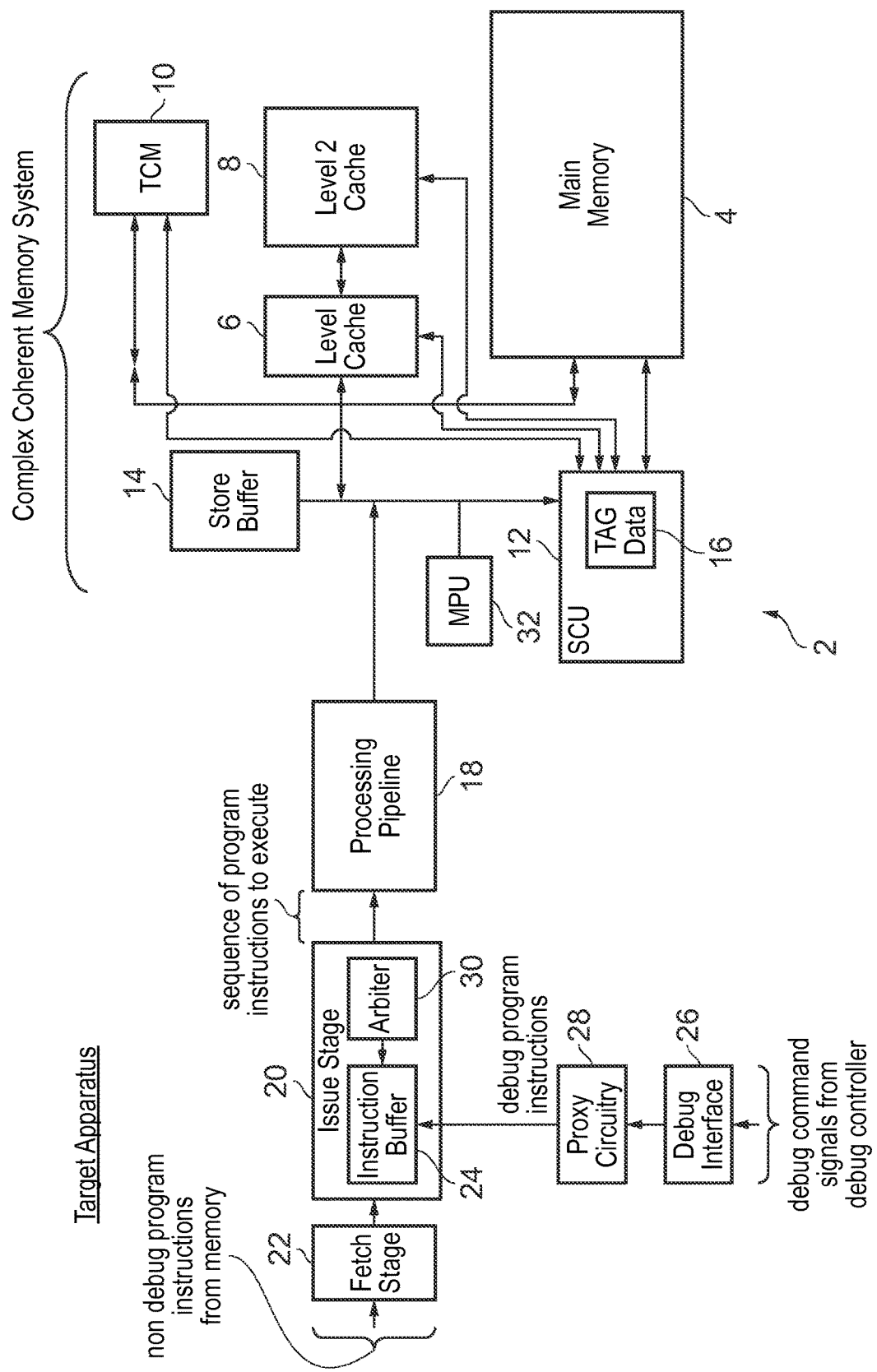
FIG. 1 schematically illustrates target apparatus to be debugged and including support for execution of debug program instructions.

FIG. 1 schematically illustrates a target apparatus 2 for executing both non-debug program instructions and debug program instructions. The target apparatus 2 includes a complex coherent memory system including a main memory 4, a level 1 cache memory 6, a level 2 cache memory 8, a tightly coupled memory 10, a snoop control unit 12 and a store buffer 14. This memory system is only one example of a memory system which may be employed. For example, the memory system may also include memory mapped peripheral devices to which both functional (non-debug) and debug (diagnostic) access is desired. The snoop control unit 12 serves as coherency control circuitry and stores TAG data 16 which is used to track which of the elements of the memory system 4, 6, 8, 10, 12 is storing a most up-to-date stored value corresponding to a given memory address within the memory address space of the memory system. The snoop control unit 12 may also be used to track which of the plurality of memory interfaces to these various elements of the complex memory system is being used by which outstanding memory accesses.

It will be appreciated that the complex coherent memory system illustrated provides a coherent view of the memory system to non-debug program instructions which are executed during non-debug operation of the system. In order to provide debug program instructions with the same view of the memory system, the present technique provides that these debug program instructions progress along the same processing pipeline 18 which also execute the non-debug program instructions. As shown in FIG. 1, the target apparatus 2 includes the processing pipeline 18 which receives a sequence of program instructions to execute from an issue stage 20. A fetch stage 22 serves to store non-debug program instructions fetched from memory into an instruction buffer 24 within the issue stage 20. A debug interface 26 receives debug command signals from a debug controller and passes these to proxy circuitry 28. The proxy circuitry 28 translates the debug command signals (in this example embodiment) into debug program instructions which are also stored into the instruction buffer circuitry 24. In this example embodiment, the instruction buffer circuitry 24 is shown as a single unit, but it will be appreciated that in other embodiments, separate stores may be provided for debug program instructions and non-debug program instructions with these separate stores collectively forming the instruction buffer circuitry 24.

In the example embodiment illustrated, the debug program instructions and the non-debug program instructions may take the form of undecoded program instructions (e.g. object code instructions). It is also possible that the mixing of the non-debug program instructions and the debug program instructions could take place at a later stage within the processing, such as after these instructions have been decoded into micro-operation instructions as are typically used within various processor implementations, e.g. superscalar implementations. The present techniques are equally applicable in such alternative implementations with the arbiter selecting a mix of debug micro-operation instructions and non-debug micro-operation instructions in accordance with an appropriate arbitration algorithm and dispatching these along the associated portion(s) of the processing pipeline 18.

The issue stage 20 in this example embodiment includes the arbiter 30 which serves to arbitrate between debug program instructions and non-debug program instructions stored within the instruction buffer 24 to select the instructions to form the sequence of program instructions passed to the processing pipeline 18 for execution. An arbitration algorithm used by the arbiter 30 could take a variety of different forms as will be discussed later.

The debug program instructions could take a variety of different forms corresponding to instructions supported within the non-debug program instruction set, or even special purpose instructions only provided for debug purposes and not having direct equivalents, or even indirect equivalents, within the non-debug program instruction set. One particularly useful form of debug program instruction comprises debug memory access instructions, such as debug load instructions and debug store instructions. Such debug load instructions and debug store instructions may be readily used to provide the diagnostic information and to manipulate the state of the target apparatus 2.

As previously mentioned, the complex coherent memory system includes a store buffer 14. This store buffer 14 may buffer store memory accesses arising during non-debug operation. The consequence of this is that memory aborts may be asynchronous with execution of non-debug store instructions by the processing pipeline 18 as they may be buffered for indeterminate periods within the store buffer 14 or elsewhere within the complex coherent memory system.

In order to address this asynchronous behaviour which could cause confusion when debug memory access instructions are mixed with non-debug memory access instructions, the proxy circuitry 28 may serve to translate a debug command specified by debug command signals received at the debug interface 26 into a sequence of debug program instructions which comprise a prefix drain store buffer instruction, a debug memory access instruction and a suffix drain store buffer instruction. The prefix drain store buffer instruction when executed controls the one or more store buffers to drain before the debug memory access instruction is performed. The suffix drain store buffer instruction controls the one or more store buffers to drain after the debug memory access instruction is performed and before any further memory access instruction is performed. This enables a memory abort associated with a debug memory access instruction to be appropriately correlated with that debug memory access instruction and thus effectively become synchronous with that debug memory access instruction in a way which simplifies the interpretation of the behaviour of the system and can prevent aborts resulting from debug instructions being incorrectly raised to software memory abort handlers.

The target apparatus 2 may support a sleep mode of operation. In the sleep mode of operation, the processing pipeline 18 does not execute any non-debug program instructions. The clock signal to the processing pipeline 18 may be gated off as appropriate in order to save power. However, during such a sleep mode it may be desirable to still conduct debug operations. Indeed, the period during a sleep mode may be a good opportunity to perform debug operations without interfering with the normal non-debug operation of the system. In order to support this, the target apparatus 2 may be arranged such that during the sleep mode when the instruction buffer 24 contains any debug program instructions, then these will be executed by the processing pipeline 18 (including restarting its clocks as required) without resuming execution of the non-debug program instructions which may be stored within the instruction buffer 24. Such an arrangement may be achieved by an appropriate configuration of the arbitration algorithm as executed by the arbiter 30.

The complex coherent memory system, in addition to the components already discussed, may also include memory access control circuitry in the form of a memory protection unit 32. Other example embodiments may include a memory management unit (programmed using a page table data stored within the memory address space) if desired. The memory protection unit divides the memory address space into regions defined by configuration data programmed into the memory protection unit 32 under software control. These regions can have different memory attributes associated with them. Page table data in embodiments including a memory management unit will similarly be programmed under software control. The memory attribute data configuring the memory protection unit 32 is applied to regulate access to the memory address space by non-debug memory access instructions during non-debug operation.

During debug operation, debug memory instructions that are issued may use their own memory attribute data which is supplied as part of the debug command signals and associated therewith as signals which progress along the processing pipeline 18 (the memory attribute data for debug instructions may be independent of the memory attribute data for the same memory addresses for non-debug instructions, or, in other embodiments dependent upon or the same as the attribute data for non-debug instructions to the same memory addresses). The sideband signals may also be used to mark memory access instructions as relating to debug rather than non-debug operation. The debug memory access instructions and the non-debug memory access instructions may be the same other than these sideband signals. The sideband signals may be exploited to ensure that any data values returned by a debug read instruction are routed to the debug interface 26 where they may be read by a debug controller rather than being routed elsewhere within the target apparatus 2, such as to a general purpose register as part of a non-debug program instruction.

The arbiter 30 may apply an arbitration algorithm having a variety of different forms. The arbitration algorithm can have a number of features which may be used either independently or in combination. The arbitration algorithm may be arranged so as to give the debug program instructions a lower priority than the non-debug program instructions, i.e. arrange for the debug program instructions to only be selected for inclusion within the sequence of program instructions to be executed by the processing pipeline when there are no non-debug program instructions waiting to be issued. Another feature of the arbitration algorithm is that it selects at least a minimum proportion of the sequence of program instructions for execution to be debug program instructions. This minimum proportion may be achieved in a variety of different ways, such as requiring a debug program instruction to be selected at least once in a given period of time. The arbitration algorithm may also be arranged so as to not insert debug instructions within atomic sequences of non-debug instructions.

Figure 2:
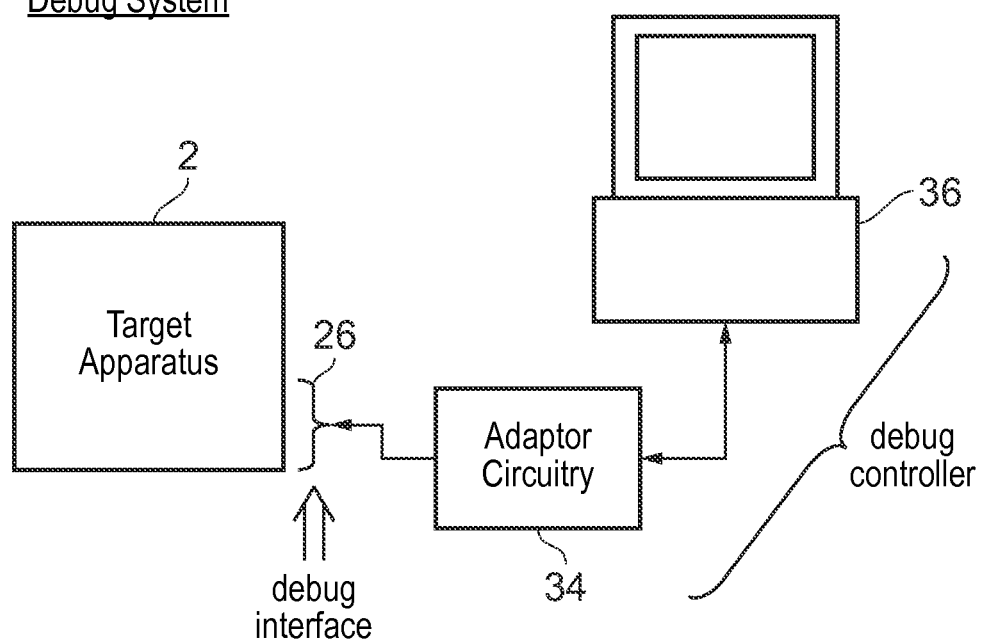
FIG. 2 schematically illustrates a debug system.

FIG. 2 schematically illustrates a debug system comprising a target apparatus 2 (e.g. the apparatus of FIG. 1) connected via adapter circuitry 34 to a general purpose computer 36 executing debug control software. The general purpose computer 36 programmed with appropriate software and the adapter circuitry 34 together may be considered to form a debug controller which generates the debug command signals applied to the debug interface 26 of the target apparatus 2. The debug controller 34, 36 may issue debug command signals which are translated by the proxy circuitry 28 into debug program instructions that are mixed in with non-debug program instructions and executed by the processing pipeline 18. Thus, debug program instruction can be executed while ongoing execution of non-debug program instructions continues. This can give more realistic debug analysis and permits the processor to be available, e.g. to execute critical real time tasks. Furthermore, mixing the debug program instructions with the non-debug program instructions enables the non-debug program instructions to benefit from the circuitry, such as memory coherency management circuitry, which is provided for the benefit of the non-debug program instructions. The debug program instructions thus, in at least some example embodiments, obtain a more realistic view of the target apparatus corresponding more directly to that encountered by the non-debug program instructions. Furthermore, the overhead associated with supporting the debug program instructions may be reduced.

Figure 3:
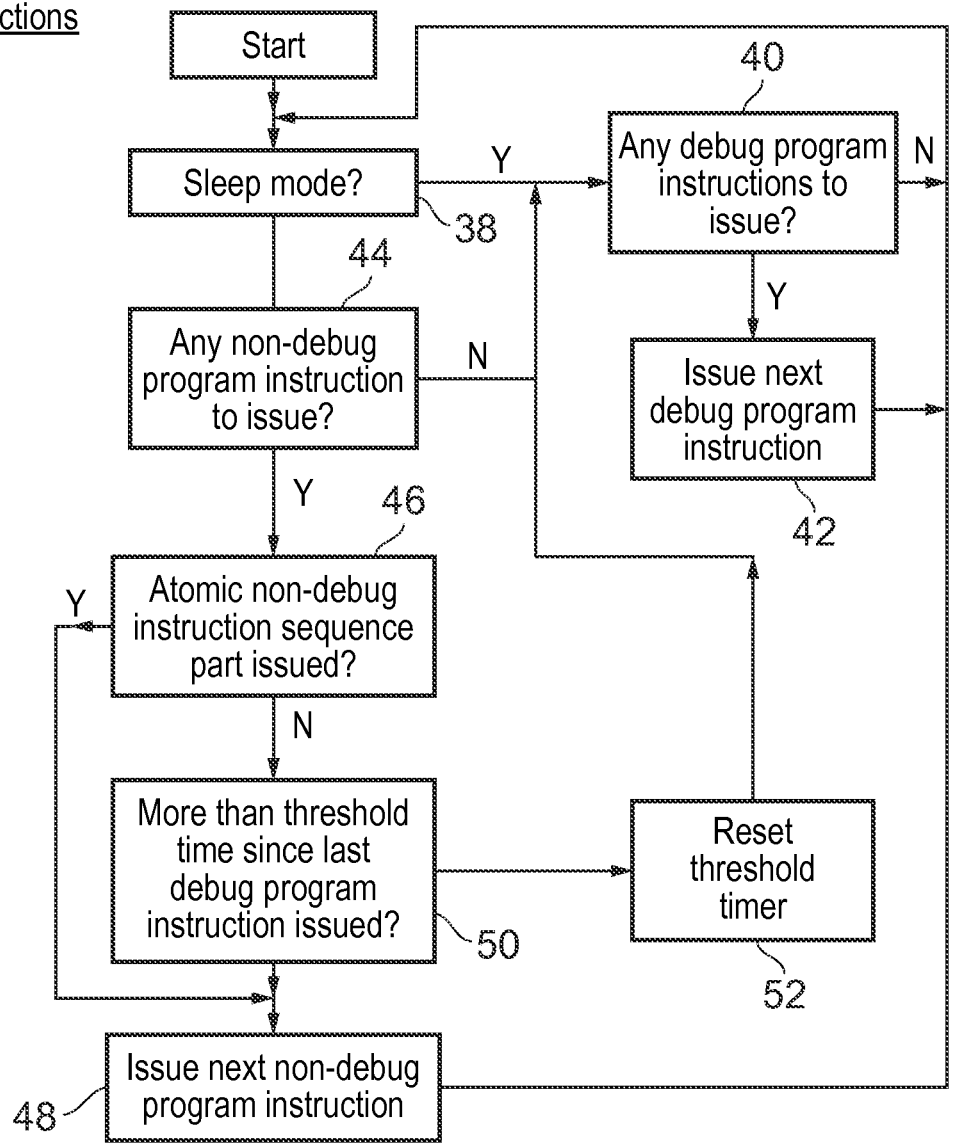
FIG. 3 is a flow diagram schematically illustrating arbitration of non-debug program instructions and debug program instructions.

FIG. 3 is a flow diagram schematically illustrating arbitration between non-debug program instructions and debug program instructions. At step 38, a determination is made as to whether or not the target apparatus 2 is currently in the sleep mode. If the target apparatus 2 is in the sleep mode, then processing proceeds to step 40 where it is determined whether or not there are any debug program instructions awaiting issue within the instruction buffer 24. If there are debug program instructions awaiting issue, then step 42 serves to issue the next debug program instruction in sequence from the instruction buffer 24 before processing returns to step 48.

If the determination at step 38 is that the target apparatus 2 is not in the sleep mode, then processing proceeds to step 44 where a determination is made as to whether or not there are any non-debug program instructions awaiting issue. If there are no non-debug program instructions awaiting issue, then processing proceeds to step 40. If there are non-debug program instructions awaiting issue, then processing proceeds to step 46.

At step 46, a determination is made as to whether or not the target apparatus 2 is currently partway through issuing a sequence of atomic non-debug program instructions. Such a sequence is one which is defined as not to be interrupted (i.e. is indivisible) and is to be processed as a unit, i.e. no intervening debug program instructions should be inserted between the atomic non-debug instruction sequence. If such an atomic non-debug instruction sequence is part issued, then processing proceeds to step 48 where the next non-debug program instruction to be issued stored within the instruction buffer 24 is issued into the processing pipeline 18, whereupon processing returns to step 38.

In some embodiments step 46 may need to be before step 44 since even if there are no current non-debug instructions to issue, it may be necessary to block debug if the system is partway through executing an atomic sequence of non-debug program instructions (e.g. in some embodiments atomic instructions may not all be ready for issue and present within the instruction buffer at the same time).

If the determination at step 46 is that there is no part issued atomic non-debugged instruction sequence pending, then processing proceeds to step 50 where a determination is made as to whether or not more than a threshold time has expired since a last debug program instruction was issued. This threshold time test ensures a minimum proportion of the program instructions selected to form the sequence of program instructions executed by the processing pipeline 18 constitute debug program instructions, absent constraints such as the atomic sequences discussed above. If more than the threshold time has expired, then processing proceeds to step 52, at which the threshold timer is reset before processing passes to step 40 where a determination is made as to whether or not there are actually any debug program instructions to be issued even if the threshold time has been exceeded.

If the determination at step 50 is that more than the threshold time since the last debug program instruction issued has not been exceeded, then processing proceeds to step 48 where the next non-debug program instruction is issued as previously described.

Figure 4:
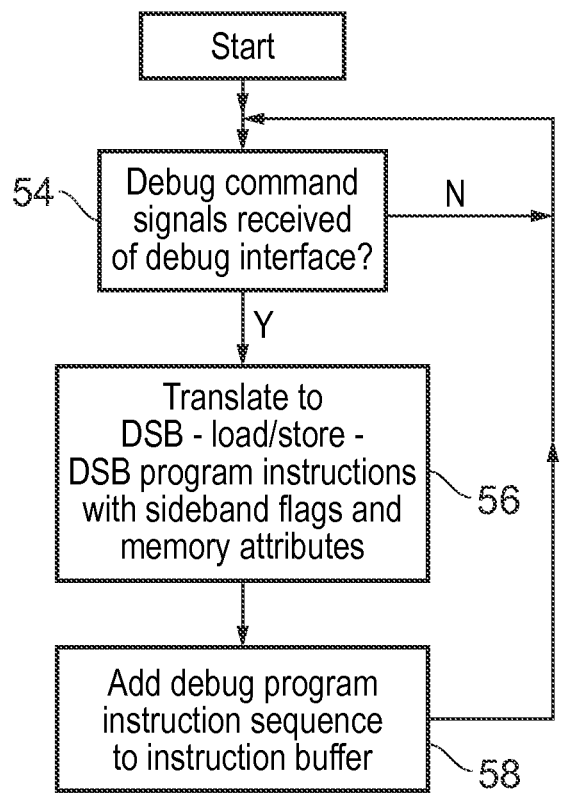
FIG. 4 is a flow diagram schematically illustrating processing performed upon receipt of debug command signals.

FIG. 4 schematically illustrates processing operations performed when debug command signals are received at the debug interface 26. At step 54 processing waits until debug command signals are received at the debug interface 26. When such signals are received, processing proceeds to step 56 whereupon the debug command signals are translated into a sequence of debug program instructions comprising a prefix drain store buffer instruction, an appropriate one of a load or store debug instruction followed by a suffix drain store buffer instruction (in some implementations this may only be required for stores as loads may be synchronous without this feature). Each of these instructions is associated with sideband signals including flags indicating that the instruction concerned is a debug instruction as well as other information, such as memory attribute information, to be applied for that load/store debug instruction in place of any memory attribute data held within the memory protection unit 32. At step 58, the debug program instruction sequence is added to the instruction buffer 24. The arbiter 30 then selects between the debug program instructions and the non-debug program instructions stored within the instruction buffer 24 to form the sequence of program instructions supplied to the processing pipeline 18.

For complex coherent memory systems it will be noted that typically these may comprise multiple CPUs (processor cores). In this case, debug may have access to all or some subset of these CPUs. If the CPUs have private memory/peripherals that are not kept coherent via the coherency hardware, then debugger accesses to these can be done through the CPU in question. However, if a debug access is performed to memory under control of the coherency system, it may be possible to provide a system where additional dynamic arbitration logic is used to decide which CPU to use for this debug access—for example, the least busy one. This is in effect an additional layer of arbitration at the debug interface level across all CPUs in the compute cluster.

The present technique recognises that the debug mechanisms may reuse circuitry within a target apparatus when performing debug operations by arranging for the debug instructions to be inserted into an instruction buffer circuitry together with the non-debug instructions. An arbiter may then arbitrate between both the debug program instructions and the non-debug program instructions to select a sequence of program instructions to be executed thereby permitting debug operations to be performed intermixed with non-debug program instructions. This helps obtain more up-to-date debug data and also reuse circuit resource already provided for executing the non-debug program instructions to also execute the debug program instructions.

It will be appreciated that the debug program instructions and the non-debug program instructions could take a variety of different forms, including both object code program instructions or at least partially decoded micro-operation instructions. The present technique may be used in all of these circumstances by arranging that the debug program instructions and the non-debug program instructions of whatever form are stored within the instruction buffer circuitry at the appropriate point within the pipeline.

In some embodiments the memory system circuitry which processes memory access program instructions for accessing at least one of conventional memory and memory mapped devices may be shared between both the debug program instructions and the non-debug program instructions. Memory systems are increasing in complexity and the ability to use the memory system circuitry which already provided for the non-debug program instructions to also support the debug program instructions saves overhead in supporting the debug mechanisms.

In some embodiments the memory system circuitry may include coherency control circuitry serving to maintain coherency for access operations to the memory system circuitry. It may be useful in some embodiments that the debug program instructions observe the same coherency constraints as the non-debug program instructions and this may be conveniently achieved by both the debug program instructions and the non-debug program instructions being mixed along the same processing pipeline and sharing the same coherency control circuitry.

While it will be appreciated that the coherency control circuitry may take a variety of different forms, in some embodiments the target apparatus includes a plurality of memories and coherency control circuitry operates to track which of the plurality of memories are storing a most up-to-date stored value corresponding to a given memory address within a memory address space.

Complex memory systems in modern processors may also include a plurality of memory interfaces for providing access to respective ones of a plurality of different memories and the coherency control circuitry will track accesses via the plurality of memory interfaces in a way which permits the debug program instructions to have the same view of memory as the non-debug program instructions with relatively little additional overhead being incurred.

In some embodiments the coherency control circuitry may comprise a snoop control unit programmable with tag data for tracking memory coherency. Such snoop control units represent a significant amount of overhead and the present techniques which enable at least some embodiments to share a snoop control unit enable a reduction in circuit overhead.

While it is possible that the debug interface could directly receive debug program instructions in the final form ready to be added to the instruction buffer circuitry, in other embodiments the system may include proxy circuitry coupled to the debug interface and configured to translate the debug command signals into the debug program instructions. Accordingly, the debug command signals may indirectly correspond to the debug program instructions and require a translation to be made (in other embodiments the debug command signals may directly represent the debug program instruction.

The debug program instructions themselves may have a form similar to the non-debug program instructions but be differentiated from the non-debug instructions by one or more sideband signals which specify that the instructions concerned are debug related rather than non-debug related. The sideband signals may also be used to carry other parameters and attributes associated with the debug program instructions, such as memory attributes when the debug program instructions are memory access instructions.

More generally, the debug program instructions can have a variety of different forms, but one particular useful form of debug program instructions that is provided in some embodiments is debug memory access instructions. Such debug memory access instructions may perform a debug load access or a debug store access either to a stored value within a memory or to an attached memory-mapped peripheral device as required.

In some embodiments the non-debug program instructions comprise non-debug store instructions and the system includes one or more store buffers configured to buffer store memory accesses such that memory aborts are asynchronous with execution of non-debug program instructions store instructions by the processing pipeline. Such asynchronous behaviour may be acceptable within non-debug operation, but can present difficulties when debug program instructions are mixed with non-debug program instructions.

In order to address the above circumstance, the proxy circuitry may be configured to translate a debug command specified by the debug command signals into a sequence of debug program instructions comprising a prefix drain store buffer instruction, a debug memory access instruction and a suffix drain store buffer instruction whereby the prefix store buffer instruction will drain all the store buffers before the debug memory access instruction is performed and then the suffix drain store buffer instruction will drain all the store buffers before any further memory access instructions are permitted. In this way, an abort arising from the debug memory access instruction will be synchronous with that debug memory access instruction in the sense that it can be an unambiguously related to that debug memory access instruction and so the behaviour of the system properly understood.

In some example embodiments, the target apparatus may support a sleep mode of operation in which the processing pipeline does not execute non-debug program instructions (e.g. the clocks to the processing pipeline may be stopped). Within such systems, the debug mechanisms may be provided such that any debug program instructions which are within the instruction buffer circuitry during sleep mode operation will be executed without resuming execution of the non-debug program instructions (e.g. this may require the clocks to be restarted just for execution of the debug program instructions while still holding off any non-debug program instructions from execution by an appropriate modification of the control of the arbiter).

In some embodiments memory access control circuitry may be provided to store non-debug memory attribute data associated with regions of memory address space. This non-debug memory attribute data may be applied to non-debug memory access instructions within the non-debug program instructions. Such non-debug memory attribute data may include parameters such as whether or not particular regions of memory contain data which is cacheable, sharable, executable, read only, read and write etc. Such non-debug memory attribute data is typically programmed by the non-debug program instructions.

The memory access control circuitry may be formed in a variety of different ways depending upon the level of sophistication desired. In some example embodiments the memory access control circuitry may be one of a memory management unit (using page table data programmed under software control) or a memory protection unit (programmed with region specifying data under software control).

As mentioned briefly above, the debug command signals may include sideband signals and these can be used, for example, to specify debug memory attribute data to be applied to debug memory access instructions within the debug program instructions. This attribute data for the debug instructions may be independent of whatever the non-debug memory attribute data may or may not specify for the memory addresses concerned or may be dependent thereon (e.g. the same as the non-debug attribute data for the same memory address). The ability for the debug memory access instructions to specify their own attribute data provides an improved degree of flexibility in the way in which the debug mechanisms may interrogate and manipulate the target apparatus.

It will be appreciated that the arbiter which selects between the debug program instructions and the non-debug program instructions could utilise an arbitration algorithm having a wide variety of different forms. In some example embodiments, the arbitration algorithm is such that it gives debug program instructions a lower priority than non-debug program instructions. Such embodiments tend to decrease the invasiveness of the debug mechanisms.

In some example embodiments the arbitration algorithm may select a debug program instruction when there are no non-debug program instructions within the instruction buffer circuitry. Such embodiments wait until the system is effectively idle before allowing debug program instructions to be executed.

In other embodiments an alternative and/or additional feature of the arbitration algorithm is that it will select at least a minimum proportion of the sequence of program instructions for execution to be debug program instructions. This feature may enable a minimum quality of service (QoS) to be provided to the debug program instructions so as to ensure that at least some of these will be executed and debug program instructions progressed at some finite rate.

In other embodiments an alternative and/or additional feature of the arbitration algorithm is that it will not separate atomic sequences of non-debug instructions by inserting debug instructions into such atomic sequences.

Although illustrative embodiments have been described in detail herein with reference to the accompanying drawings, it is to be understood that the claims are not limited to those precise embodiments, and that various changes, additions and modifications can be effected therein by one skilled in the art without departing from the scope and spirit of the appended claims. For example, various combinations of the features of the dependent claims could be made with the features of the independent claims.

We claim:

1. Apparatus for processing data comprising:
a processing pipeline configured to execute a sequence of program instructions;
a debug interface configured to receive debug command signals corresponding to debug program instructions to be executed;
instruction buffer circuitry configured to store both said debug program instructions and non-debug program instructions;
an arbiter coupled to said instruction buffer and configured to arbitrate between both said debug program instructions and said non-debug program instructions stored within said instruction buffer to select said sequence of program instructions to be executed by said processing pipeline;
memory system circuitry configured to process memory access program instructions for accessing at least one of stored values within a memory and memory mapped devices, wherein said memory system circuitry is shared by both said debug program instructions and said non-debug program instructions executed by said processing pipeline, wherein said memory system circuitry comprises coherency control circuitry coupled to said processing pipeline and configured to maintain memory coherency for access operations to said memory system circuitry;
wherein the apparatus comprises a plurality of memories and said coherency control circuitry is configured to track which of said plurality of memories are storing a most up-to-date stored value corresponding to a given memory address within a memory address space.

2. Apparatus as claimed in claim 1, wherein said debug program instructions and said non-debug program instructions stored in said instruction buffer circuitry comprises one of:
undecoded program instructions; and
at least partially decoded micro-operation instructions.

3. Apparatus as claimed in claim 1, comprising a plurality of memory interfaces for providing access to respective ones of said plurality of memories and wherein said coherency control circuitry tracks access via said plurality of memory interfaces.

4. Apparatus as claimed in claim 1, comprising proxy circuitry coupled to said debug interface and configured to translate said debug command signals into said debug program instructions.

5. Apparatus as claimed in claim 1, wherein said debug program instructions comprise debug memory access instructions.

6. Apparatus as claimed in claim 5, wherein said debug memory access instructions comprise non-debug memory access instructions with additional one or more sideband signals at least identifying said debug memory access instructions as a debug memory access instructions.

7. Apparatus as claimed in claim 1, comprising memory access control circuitry configured to store non-debug memory attribute data associated with regions of memory address space, wherein said non-debug memory attribute data is applied to non-debug memory access instructions within said non-debug program instructions.

8. Apparatus as claimed in claim 7, wherein said non-debug memory attribute data is programmed by said non-debug program instructions.

9. Apparatus as claimed in claim 7, wherein said memory access control circuitry is one of:
a memory management unit; and
a memory protection unit.

10. Apparatus as claimed in claim 7, wherein said debug command signals specify debug memory attribute data applied to debug memory access instructions within said debug program instructions.

11. Apparatus as claimed in claim 1, wherein said arbiter applies an arbitration algorithm that gives said debug program instructions a lower priority than said non-debug program instructions.

12. Apparatus as claimed in claim 11, wherein said arbitration algorithm selects a debug program instruction when there are no non-debug program instructions within said instruction buffer.

13. Apparatus as claimed in claim 1, comprising a plurality of processing pipelines and a pipeline arbiter configured to select which of said plurality of processing pipelines is to execute a given debug program instruction.

14. Apparatus for processing data comprising:
a processing pipeline configured to execute a sequence of program instructions;
a debug interface configured to receive debug command signals corresponding to debug program instructions to be executed;
instruction buffer circuitry configured to store both said debug program instructions and non-debug program instructions;
an arbiter coupled to said instruction buffer and configured to arbitrate between both said debug program instructions and said non-debug program instructions stored within said instruction buffer to select said sequence of program instructions to be executed by said processing pipeline;
memory system circuitry configured to process memory access program instructions for accessing at least one of stored values within a memory and memory mapped devices, wherein said memory system circuitry is shared by both said debug program instructions and said non-debug program instructions executed by said processing pipeline, wherein said memory system circuitry comprises coherency control circuitry coupled to said processing pipeline and configured to maintain memory coherency for access operations to said memory system circuitry;
wherein said coherency control circuitry comprises a snoop control unit programmable with tag data for tracking memory coherency.

15. Apparatus for processing data comprising:
a processing pipeline configured to execute a sequence of program instructions;
a debug interface configured to receive debug command signals corresponding to debug program instructions to be executed;
instruction buffer circuitry configured to store both said debug program instructions and non-debug program instructions;
an arbiter coupled to said instruction buffer and configured to arbitrate between both said debug program instructions and said non-debug program instructions stored within said instruction buffer to select said sequence of program instructions to be executed by said processing pipeline;
wherein said debug program instructions comprise debug memory access instructions; and
wherein said non-debug program instructions comprise non-debug store instructions and further comprising one or more store buffers configured to buffer store memory accesses such that memory aborts are asynchronous with execution of non-debug store instructions by said processing pipeline.

16. Apparatus as claimed in claim 15, comprising proxy circuitry coupled to said debug interface and configured to translate said debug command signals into said debug program instructions wherein said proxy circuitry is configured to translate a debug command specified by said debug command signals into a sequence of debug program instructions comprising:
a prefix drain store buffer instruction;
a debug memory access instruction; and
a suffix drain store buffer instruction, whereby
said prefix drain store buffer instruction controls said one or more store buffers to drain before said debug memory access instruction is performed and said suffix drain store buffer instruction controls said one or more store buffers to drain after said debug memory access instruction is performed and before any further memory access instruction is performed.

17. Apparatus for processing data comprising:
a processing pipeline configured to execute a sequence of program instructions;
a debug interface configured to receive debug command signals corresponding to debug program instructions to be executed;
instruction buffer circuitry configured to store both said debug program instructions and non-debug program instructions;
an arbiter coupled to said instruction buffer and configured to arbitrate between both said debug program instructions and said non-debug program instructions stored within said instruction buffer to select said sequence of program instructions to be executed by said processing pipeline;
wherein said apparatus supports a sleep mode of operation in which said processing pipeline does not execute non-debug program instructions and any debug program instructions within said instruction buffer circuitry are executed without resuming execution of said non-debug program instructions.

18. Apparatus for processing data comprising:
a processing pipeline configured to execute a sequence of program instructions;
a debug interface configured to receive debug command signals corresponding to debug program instructions to be executed;
instruction buffer circuitry configured to store both said debug program instructions and non-debug program instructions;

an arbiter coupled to said instruction buffer and configured to arbitrate between both said debug program instructions and said non-debug program instructions stored within said instruction buffer to select said sequence of program instructions to be executed by said processing pipeline;

wherein said arbiter is configured to apply an arbitration algorithm that gives said debug program instructions a lower priority than said non-debug program instructions; and wherein said arbitration algorithm selects at least a minimum proportion of said sequence of program instructions for execution to be said debug program instructions.

19. Apparatus for processing data comprising:

a processing pipeline configured to execute a sequence of program instructions;

a debug interface configured to receive debug command signals corresponding to debug program instructions to be executed;

instruction buffer circuitry configured to store both said debug program instructions and non-debug program instructions;

an arbiter coupled to said instruction buffer and configured to arbitrate between both said debug program instructions and said non-debug program instructions stored within said instruction buffer to select said sequence of program instructions to be executed by said processing pipeline;

wherein said arbiter is configured to apply an arbitration algorithm that gives said debug program instructions a lower priority than said non-debug program instructions; and wherein said arbitration algorithm does not separate atomic sequences of non-debug program instructions.

20. A method of processing data comprising the steps of:

executing a sequence of program instructions using a processing pipeline;

receiving via a debug interface debug command signals corresponding to debug program instructions to be executed;

storing within an instruction buffer both said debug program instructions and non-debug program instructions; and arbitrating between both said debug program instructions and said non-debug program instructions stored within said instruction buffer to select said sequence of program instructions to be executed by said processing pipeline;

wherein said arbitrating step comprises applying an arbitration algorithm that gives said debug program instructions a lower priority than said non-debug program instructions, wherein said arbitration algorithm selects at least a minimum proportion of said sequence of program instructions for execution to be said debug program instructions.

21. A method of debugging a target apparatus for processing data, said method comprising the steps of:

generating debug command signals using a debug controller;

transmitting said debug command signals to said target apparatus;

receiving via a debug interface of said target apparatus said debug command signals corresponding to debug program instructions to be executed;

storing within an instruction buffer of said target apparatus both said debug program instructions and non-debug program instructions;

arbitrating, using an arbiter of said target apparatus, between both said debug program instructions and said non-debug program instructions stored within said instruction buffer to select a sequence of program instructions to be executed by a processing pipeline of said target apparatus, wherein said arbitrating step comprises applying an arbitration algorithm that gives said debug program instructions a lower priority than said non-debug program instructions, wherein said arbitration algorithm selects at least a minimum proportion of said sequence of program instructions for execution to be said debug program instructions; and executing said sequence of program instructions using said processing pipeline of said target apparatus.

22. A debug system comprising a debug controller configured to generate debug command signals for a target apparatus comprising an apparatus as claimed in claim 1.

* * * * *